(12) United States Patent
Levy

(10) Patent No.: US 10,992,468 B2
(45) Date of Patent: Apr. 27, 2021

(54) KEY SCHEDULE DETERMINATION

(71) Applicant: Arm Limited, Cambridge (GB)

(72) Inventor: Yoav Asher Levy, Kfar-Saba (IL)

(73) Assignee: Arm Limited, Cambridge (GB)

( * ) Notice: Subject to any disclaimer, the term of this patent is extended or adjusted under 35 U.S.C. 154(b) by 350 days.

(21) Appl. No.: 15/924,691

(22) Filed: Mar. 19, 2018

(65) Prior Publication Data
US 2019/0288835 A1    Sep. 19, 2019

(51) Int. Cl.
*H04L 9/00* (2006.01)
*H04L 9/08* (2006.01)
*H04L 9/06* (2006.01)

(52) U.S. Cl.
CPC ............ *H04L 9/088* (2013.01); *H04L 9/0618* (2013.01); *H04L 9/0891* (2013.01)

(58) Field of Classification Search
CPC ...... G06F 8/4452; G06F 9/3836; G06F 15/00; G06F 8/441; G06F 8/443
See application file for complete search history.

(56) References Cited

U.S. PATENT DOCUMENTS

| | | | | |
|---|---|---|---|---|
| 5,881,263 A | * | 3/1999 | York | G06F 9/30043 712/217 |
| 2006/0236102 A1 | * | 10/2006 | Golic | H04L 9/0618 713/168 |
| 2014/0359591 A1 | * | 12/2014 | Park | G06F 9/3863 717/151 |

OTHER PUBLICATIONS

Diffie et al., "SMS4 Encryption Algorithm for Wireless Networks", version 1.03, May 15, 2008, 5 pages.
Cheng et al., "Improvements of SM4 Algorithm and Application in Ethernet Encryption System Based on FPGA", Journal of Information Hiding and Multimedia Signal Processing, Ubiquitous International, vol. 5, No. 3, Jul. 2014, pp. 518-526.
Su et al., "Security of the SMS4 Block Cipher Against Differential Cryptanalysis", Journal of Computer Science and Technology, 26(1), Jan. 2011, pp. 130-138.
Information Technology—Security Techniques—Modes of Operation for a Block Cipher, GB/T 17964-2008, National Standard of the People's Republic of China, Issue Date: Jun. 26, 2008, 37 pages.
Security Requirements for Cryptographic Modules, GM/T 0028-2014, Professional Standard of the People's Republic of China, Issue Date: Feb. 13, 2014, 101 pages.

(Continued)

*Primary Examiner* — Ghazal B Shehni
(74) *Attorney, Agent, or Firm* — Nixon & Vanderhye P.C.

(57) ABSTRACT

Data processing apparatuses and methods for performing an iterative determination of a key schedule are provided. A set of registers initially receives an input data item and data processing is then performed using the content of the set of registers as an input. The result of this data processing is then used to update a value stored in a predetermined register of the set of registers at each iterative round of the determination of the key schedule. Dependent on whether the data processing apparatus is in a reverse key expansion mode or a forwards key expansion mode determines which register in the set of registers is that predetermined register. Further, the set of registers is arranged to shift values contained in the set of registers in a direction which depends on whether the data processing apparatus is in a reverse key expansion mode or a forwards key expansion mode. The directions for the two modes are opposite to one another.

17 Claims, 17 Drawing Sheets

(56) References Cited

OTHER PUBLICATIONS

SM4 Block Cipher Algorithm, GM/T 0002-2012, Professional Standard of the People's Republic of China, Issue Date: Mar. 21, 2012, 11 pages.

Information Security Technology—SM4 Block Cipher Algorithm, GB/T 32907-2016, National Standard of the People's Republic of China, Issue Date: Aug. 29, 2016, 12 pages.

* cited by examiner

Encryption:

| States | KEY_EXPANSION | ENCRYPTION | KEY_EXPANSION | ENCRYPTION | ... | KEY_EXPANSION | ENCRYPTION |
|---|---|---|---|---|---|---|---|
| Counter | 0 | 1 | 2 | 3 | ... | 62 | 63 |
| Round function result | Rk0=K4 | Round 0 | Rk1=K5 | Round 1 | ... | Rk31=K35 | Round 31 |

FIG. 11A

Decryption:

First stage - Incremental key expansion

| States | KEY_EXPANSION | KEY_EXPANSION | KEY_EXPANSION | KEY_EXPANSION | ... | KEY_EXPANSION | KEY_EXPANSION |
|---|---|---|---|---|---|---|---|
| Counter | 0 | 1 | 2 | 3 | ... | 30 | 31 |
| Round function result | Rk0=K4 | Rk1=K5 | Rk2=K6 | Rk31=K7 | ... | Rk30=K34 | Rk31=K35 |

FIG. 11B

Second stage - Reverse key expansion and decryption:

| States | DECRYPTION | KEY_EXPANSION | DECRYPTION | KEY_EXPANSION | ... | DECRYPTION | KEY_EXPANSION | DECRYPTION | DECRYPTION | DECRYPTION |
|---|---|---|---|---|---|---|---|---|---|---|
| Counter | 0 | 1 | 2 | 3 | ... | 56 | 57 | 58 | 59 |
| Round function result | Round 0 | Rk27=K31 | Round 1 | Rk26=K30 | ... | Round 28 | Rk29 | Round 30 | Round 31 |

FIG. 11C

Encryption:

| States | KEY_EXPANSION | ENCRYPTION | KEY_EXPANSION | ENCRYPTION | | KEY_EXPANSION | ENCRYPTION | KEY_EXPANSION | KEY_EXPANSION | KEY_EXPANSION |
|---|---|---|---|---|---|---|---|---|---|---|
| Counter | 0 | 1 | 2 | 3 | ... | 62 | 63 | 64 | 65 | ... | 95 |
| Round function result | Rk0=K4 | Round0 | Rk1=K5 | Round1 | ... | Rk31=K35 | Round31 | Rk27=K31 | Rk26=K30 | ... | K0 |

FIG. 11D

Decryption:

first stage - incremental key expansion:

| States | KEY_EXPANSION | KEY_EXPANSION | KEY_EXPANSION | KEY_EXPANSION | | KEY_EXPANSION | KEY_EXPANSION |
|---|---|---|---|---|---|---|---|
| Counter | 0 | 1 | 2 | 3 | ... | 30 | 31 |
| Round function result | Rk0=K4 | Rk1=K5 | Rk2=K6 | Rk3=K7 | ... | Rk30=K34 | Rk31=K35 |

FIG. 11E

Second stage – reverse key expansion and decryption:

| States | KEY_EXPANSION | DECRYPTION | KEY_EXPANSION | DECRYPTION | DECRYPTION | DECRYPTION | DECRYPTION | DECRYPTION | KEY_EXPANSION | KEY_EXPANSION | KEY_EXPANSION | KEY_EXPANSION |
|---|---|---|---|---|---|---|---|---|---|---|---|---|
| Counter | 0 | 1 | 2 | 3 | ... | 56 | 57 | 58 | 59 | 60 | 61 | 62 | 63 |
| Round function result | Round0 | RK27=K31 | Round1 | RK26=K30 | ... | Round28 | Round29 | Round30 | Round31 | K3 | K2 | K1 | K0 |

FIG. 11F

Encryption:

| States | KEY EXPANSION | ENCRYPTION | KEY EXPANSION | ENCRYPTION | ... | KEY EXPANSION | ENCRYPTION |
|---|---|---|---|---|---|---|---|
| Counter | 0-3 | 4-7 | 8-11 | 12-15 | ... | 248-251 | 252-255 |
| Round function result | Rk0=K4 | Round 0 | Rk1=K5 | Round 1 | ... | Rk31=K35 | Round 31 |

FIG. 12A

Decryption:

First stage - Incremental key expansion

| States | KEY EXPANSION | KEY EXPANSION | KEY EXPANSION | KEY EXPANSION | ... | KEY EXPANSION | KEY EXPANSION |
|---|---|---|---|---|---|---|---|
| Counter | 0-3 | 4-7 | 8-11 | 12-15 | ... | 120-123 | 124-127 |
| Round function result | Rk0=K4 | Rk1=K5 | Rk2=K6 | Rk31=K7 | ... | Rk30=K34 | Rk31=K35 |

FIG. 12B

Second stage - Reverse key expansion and decryption:

| States | DECRYPTION | KEY EXPANSION | DECRYPTION | KEY EXPANSION | ... | DECRYPTION | DECRYPTION | DECRYPTION | DECRYPTION |
|---|---|---|---|---|---|---|---|---|---|
| Counter | 0-3 | 4-7 | 8-11 | 12-15 | ... | 224-227 | 228-231 | 232-235 | 236-239 |
| Round function result | Round 0 | Rk27=K31 | Round 1 | Rk26=K30 | ... | Round 28 | Round 29 | Round 30 | Round 31 |

FIG. 12C

Encryption:

| States | KEY_EXPANSION | ENCRYPTION | KEY_EXPANSION | ENCRYPTION | ... | KEY_EXPANSION | ENCRYPTION | KEY_EXPANSION | KEY_EXPANSION | ... | KEY_EXPANSION |
|---|---|---|---|---|---|---|---|---|---|---|---|
| Counter | 0-3 | 4-7 | 8-11 | 12-15 | ... | 248-251 | 252-255 | 256-259 | 260-263 | ... | 380-383 |
| Round function result | Rk0=K4 | Round0 | Rk1=K5 | Round1 | ... | Rk31=K35 | Round31 | Rk27=K31 | Rk26=K30 | ... | K0 |

FIG. 12D

Decryption:

first stage - incremental key expansion:

| States | KEY_EXPANSION | KEY_EXPANSION | KEY_EXPANSION | KEY_EXPANSION | ... | KEY_EXPANSION | KEY_EXPANSION |
|---|---|---|---|---|---|---|---|
| Counter | 0-3 | 4-7 | 8-11 | 12-15 | ... | 120-123 | 124-127 |
| Round function result | Rk0=K4 | Rk1=K5 | Rk2=K6 | Rk31=K7 | ... | Rk30=K34 | Rk31=K35 |

FIG. 12E

Second stage – reverse key expansion and decryption:

| States | DECRYPTION | KEY_EXPANSION | DECRYPTION | KEY_EXPANSION | ... | DECRYPTION | DECRYPTION | DECRYPTION | KEY_EXPANSION | KEY_EXPANSION | KEY_EXPANSION | KEY_EXPANSION |
|---|---|---|---|---|---|---|---|---|---|---|---|---|
| Counter | 0-3 | 4-7 | 8-11 | 12-15 | ... | 224-227 | 228-231 | 232-235 | 236-239 | 240-243 | 244-247 | 248-251 | 252-255 |
| Round function result | Round0 | RK27=K31 | Round1 | RK26=K30 | ... | Round28 | Round29 | Round30 | Round31 | K3 | K2 | K1 | K0 |

FIG. 12F

KEY SCHEDULE DETERMINATION

TECHNICAL FIELD

The present disclosure relates to data processing. More particularly it relates to key schedule determination in a data processing apparatus.

BACKGROUND

Key expansion, i.e. the process by which an initial key value is iteratively transformed into a sequence of updated key values, may form part of the implementation of an encryption algorithm. Moreover, this key expansion may be implemented as an iterative process by which a key schedule is determined, the key schedule comprising sequence of key values each determined from a previous key value. Support for the implementation of an encryption algorithm, including such a key schedule determination, may be required to be supported in a wide variety of data processing apparatuses, yet with the ever greater pressure for ever smaller and simpler devices to be able to support such encryption algorithms, their implementation needs to be ever more efficient.

SUMMARY

At least one example described herein provides a data processing apparatus for performing an iterative determination of a key schedule, the apparatus comprising: a set of registers each arranged to initially receive a respective input data item; data processing circuitry to perform a data processing operation on an intermediate data item and to generate a resultant data item, wherein the intermediate data item is based on content of the set of registers; and register update circuitry to update a value stored in a predetermined register of the set of registers with a current value of the resultant data item at each iterative round of the determination of the key schedule, wherein when the data processing apparatus is in a reverse key expansion mode the predetermined register is a second register in the set of registers and the set of registers is arranged to shift values contained in the set of registers in a first direction and to feedback a value in a last register in the set of registers to a first register in the set of registers, wherein when the data processing apparatus is in a forwards key expansion mode the predetermined register is the last register in the set of registers and the set of registers is arranged to shift the values contained the set of registers in a second direction, and wherein the second direction is an opposite direction to the first direction.

At least one example described herein provides a method of performing an iterative determination of a key schedule in a data processing apparatus, the comprising the steps of: initially receiving respective input data item in a set of registers; performing a data processing operation on an intermediate data item to generate a resultant data item, wherein the intermediate data item is based on content of the set of registers; and updating a value stored in a predetermined register of the set of registers with a current value of the resultant data item at each iterative round of the determination of the key schedule, wherein when the data processing apparatus is in a reverse key expansion mode the predetermined register is a second register in the set of registers updating the value the set of registers comprises shifting values contained in the set of registers in a first direction and feeding back a value in a last register in the set of registers to a first register in the set of registers, and when the data processing apparatus is in a forwards key expansion mode the predetermined register is the last register in the set of registers updating the value comprises shifting the values contained the set of registers in a second direction, and wherein the second direction is an opposite direction to the first direction.

At least one example described herein provides a data processing apparatus for performing iterative determination of a key schedule, the apparatus comprising: means for initially receiving respective input data item in a set of registers; means performing a data processing operation on an intermediate data item to generate a resultant data item, wherein the intermediate data item is based on content of the set of registers; and means for updating a value stored in a predetermined register of the set of registers with a current value of the resultant data item at each iterative round of the determination of the key schedule, wherein when the data processing apparatus is in a reverse key expansion mode the predetermined register is a second register in the set of registers updating the value the set of registers comprises shifting values contained in the set of registers in a first direction and feeding back a value in a last register in the set of registers to a first register in the set of registers, and when the data processing apparatus is in a forwards key expansion mode the predetermined register is the last register in the set of registers updating the value comprises shifting the values contained the set of registers in a second direction, and wherein the second direction is an opposite direction to the first direction.

BRIEF DESCRIPTION OF THE DRAWINGS

The present invention will be described further, by way of example only, with reference to embodiments thereof as illustrated in the accompanying drawings, in which:

FIGS. 11A, 11B and 11C show a sequence of stages followed during encryption and decryption when carried out by a 4×S-box configuration of the apparatus of FIG. 10;

FIGS. 11D, 11E and 11F show a sequence of stages followed during encryption and decryption when carried out by a 4×S-box configuration of the apparatus of FIG. 10, which additionally rolls back the key to its initial value at the conclusion of each encryption/decryption operation;

FIGS. 12A, 12B and 12C show a sequence of stages followed during encryption and decryption when carried out by a 1×S-box configuration of the apparatus of FIG. 10;

FIGS. 12D, 12E and 12F show a sequence of stages followed during encryption and decryption when carried out by a 1×S-box configuration of the apparatus of FIG. 10, which additionally rolls back the key to its initial value at the conclusion of each encryption/decryption operation.

DESCRIPTION OF EMBODIMENTS

Figure 1:
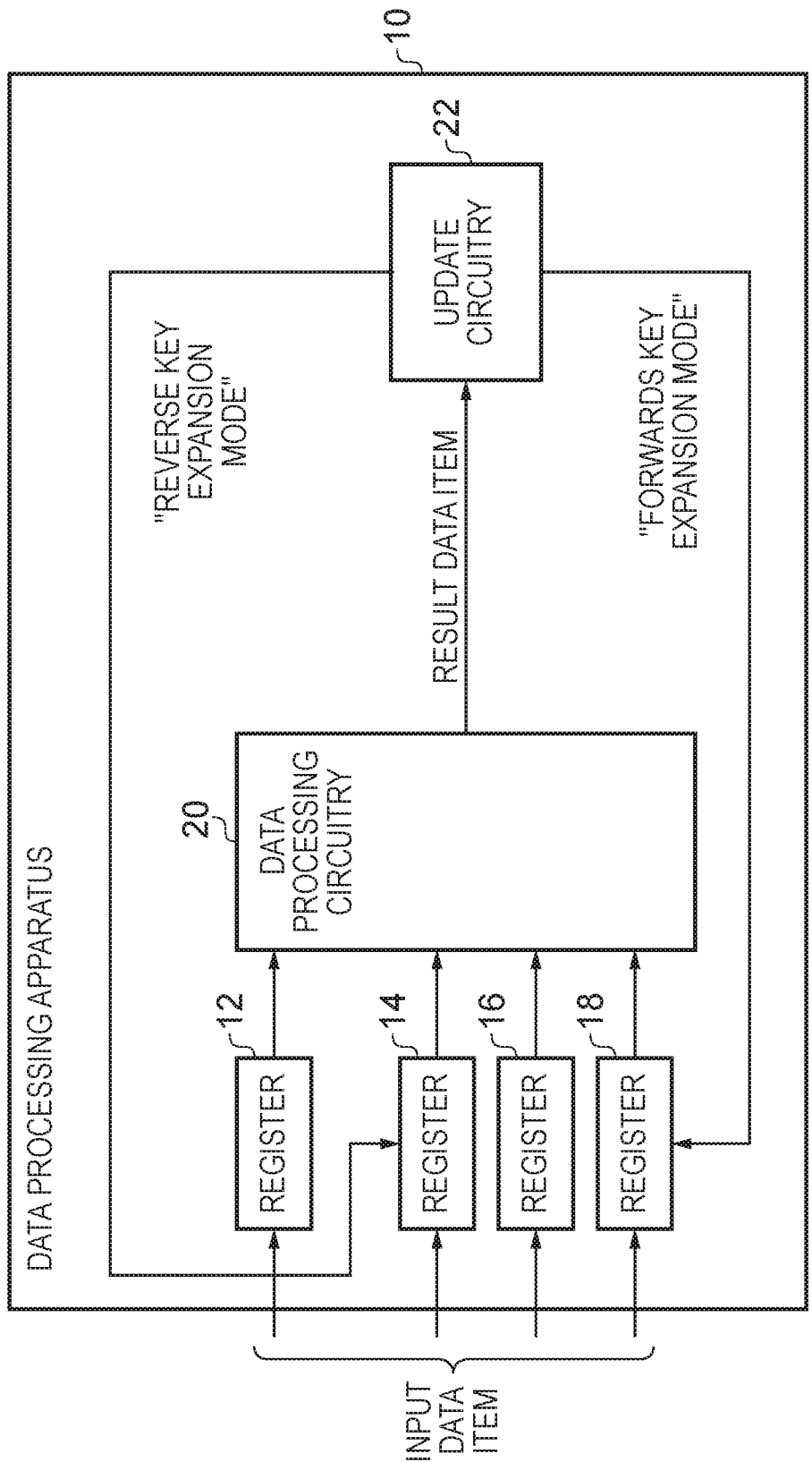
FIG. 1 schematically illustrates a data processing apparatus in embodiments.

At least one example described herein provides a data processing apparatus for performing an iterative determination of a key schedule, the apparatus comprising: a set of registers each arranged to initially receive a respective input data item; data processing circuitry to perform a data processing operation on an intermediate data item and to generate a resultant data item, wherein the intermediate data item is based on content of the set of registers; and register update circuitry to update a value stored in a predetermined register of the set of registers with a current value of the resultant data item at each iterative round of the determination of a key schedule, wherein when the data processing apparatus is in a reverse key expansion mode the predetermined register is a second register in the set of registers and the set of registers is arranged to shift values contained in the set of registers in a first direction and to feedback a value in a last register in the set of registers to a first register in the set of registers, wherein when the data processing apparatus is in a forwards key expansion mode the predetermined register is the last register in the set of registers and the set of registers is arranged to shift the values contained the set of registers in a second direction, and wherein the second direction is an opposite direction to the first direction.

The data processing apparatus is arranged to perform an iterative determination of a key schedule, that is to say on the basis of an initial key value which it receives, the data processing apparatus carries out a number of rounds of determination which provide a sequence of evolved key values, the key values determined for the key schedule then being available for use in the implementation of an encryption or decryption algorithm. For this purpose the data processing apparatus is provided with a set of registers which initially receives a first set of values and data processing circuitry of the data processing apparatus then performs a data processing operation on the basis of the content of the set of registers. This data processing operation may be variously defined but its result is then caused to be stored in a predetermined register of the set of registers. Which of the registers in the set of registers is updated in this manner depends on the particular mode in which the data processing apparatus is currently operating. However, it will be understood that this essentially circular path for the data which the data processing apparatus handles (i.e. from the set of registers through the data processing circuitry and via the register update circuitry back into the set of registers) enables the iterative evolution of the key schedule to be performed. This may be referred to as a "round function".

Nevertheless the inventor of the present techniques has found that certain challenges arise in providing a data processing apparatus for performing an iterative determination of the key schedule, particularly where there is also a desire to limit the size and complexity of the data processing apparatus provided. For example, whilst a forwards key expansion represents a more straightforward process for a data processing apparatus to implement (e.g. for an encryption process), in that a received initial key value can for example be evolved by an iteration, made use of, evolved by a second evolution, made use of, and so on through the full expansion of the full (forwards) key schedule, the implementation of a reverse key expansion presents further challenges, particularly in the context of a data processing apparatus with limited capability and resources.

For example, when a data processing apparatus only has limited storage (e.g. memory) capability, it may not be provided with sufficient storage to maintain the full key schedule (i.e. the key values for each iteration), at any given time and therefore must generate each key value as it is required. Where the data processing apparatus may only be provided with the above mentioned initial key value (at which the forward key expansion is started and conversely at which the reverse key expansion ends), further steps may be required in order to provide the necessary key value as part of an iterative determination of the key schedule where reverse key expansion is required (e.g. for decryption). Furthermore, the manner in which such a reverse key expansion is to be carried out is non-trivial, since encryption algorithm definitions typically only define parameters of an initial key value and the manner in which that initial key value is (forwards) expanded, the assumption being that once this process has been carried out then all key values of the resulting key schedule are then available (i.e. locally stored and then could each be used, in reverse order, for the reverse key schedule). However, in a data processing apparatus with limited storage capacity this may not be possible. In this context the inventor of the present techniques has found that a limited set of hardware components, without significant storage, can nevertheless support such a reverse key expansion (thus allowing the key values of the reverse key schedule to be determined on-the-fly), where this is based on a set of registers together arranged as a set of shift registers, but where the data processing apparatus may be operated in two complementary key expansion modes, namely a forward key expansion mode and a reverse key expansion mode.

When the data processing apparatus is operating in the forward key expansion mode the resultant data item of the data processing is fed back to one end of the set of shift registers (defined above as the "last" register in the set of registers) to then be shifted sequentially through the other registers of the set of registers by the shift action of the set of registers. By contrast when the data processing apparatus is operating in the reverse key expansion mode the resultant data item of the data processing is fed back into a "second" register in the set of registers, i.e. in a penultimate position at the other end of the set of registers with respect to the above-mentioned "last" register of the set of registers. Moreover, when in the reverse key expansion mode the shift action of the set of registers operates in the opposite direction, with the value in the last register being looped back round to the first register in the set of registers. Further understanding of why this is so will become apparent from the discussions and example embodiments given below.

The data processing apparatus may further comprise control circuitry to control the data processing apparatus to perform an encryption process in which the data processing apparatus alternately performs a forwards key expansion stage in the forwards key expansion mode and performs an encryption stage in an encryption mode, wherein in the forwards key expansion mode the control circuitry controls the data processing circuitry such that the respective input data items initially received by each register of the set of registers is a portion of an encryption key, wherein in the encryption mode the control circuitry controls the data processing circuitry such that the respective input data items initially received by each register of the set of registers is a portion of a plaintext data item and such that the intermediate data item is further based on the result of a preceding forwards key expansion stage, and wherein when the data processing apparatus is in the encryption mode the predetermined register is the last register in the set of registers and the set of registers is arranged to shift the values contained the set of registers in the second direction.

Accordingly, the data processing apparatus may be used not only to perform the iterative determination of the key schedule, but to also perform a corresponding encryption process which makes use of the key values determined in that key schedule determination, specifically those determined by the data processing apparatus in its forward key expansion mode. Thus, by ultimately performing the forwards key expansion stage by stage interleaved with corresponding encryption stages, for example it is possible to receive an initial portion of a plain text data item and apply the full encryption process through the full (forwards) key schedule so that a resulting portion of cipher-text can be generated, using only the limited set of components provided by the data processing apparatus.

The control circuitry may be arranged to control the data processing circuitry to perform a reverse key expansion sequence in the reverse key expansion mode comprising performing a plurality of reverse key expansion stages, wherein the reverse key expansion sequence is arranged to reverse the data processing operations performed by the data processing circuitry in the forwards key expansion stages of the encryption process.

Thus, conversely, the same data processing apparatus can also perform the complementary reverse key expansion sequence by performing a plurality of reverse key expansion stages which, stage-by-stage, reverse the forwards key expansion stages discussed above. Doing so has more than one purpose. On the one hand this may support a decryption process which is complementary to the above discussed encryption process. However, in the context of a data processing apparatus with limited storage capacity this reverse key expansion sequence may also be made use of if the data processing apparatus is only provided with the initial key value once. This is because it may not have the capacity to store this initial key value to therefore be available for a further encryption process to be carried out. In this context the inventor of the present techniques has realised that this issue may be addressed by configuring the data processing apparatus to be able to perform the plural reverse key expansion stages as a consecutive block.

The reverse key expansion sequence may comprise performing the plurality of reverse key expansion stages sequentially.

In other words whilst the key expansion stages may be interleaved with decryption stages, the full reverse key expansion may be carried out as a single process with each of the plurality of reverse key expansion stages being performed sequentially to "rollback" a key value evolved through a forwards key expansion back to the initial key value. The data processing apparatus therefore does not need to store the initial key value and has the ability to recreate it starting from the "other end".

The control circuitry may be further arranged to control the data processing apparatus to perform a decryption process in which the data processing apparatus alternately performs a reverse key expansion stage of the plurality of reverse key expansion stages in the reverse key expansion mode and performs a decryption stage in a decryption mode, wherein in the reverse key expansion mode the control circuitry controls the data processing circuitry such that the respective input data items initially received by each register of the set of registers is a portion of a decryption key, wherein in the decryption mode the control circuitry controls the data processing circuitry such that the respective input data items initially received by each register of the set of registers is a portion of a cipher-text data item and such that the intermediate data item is further based on the result of a preceding reverse key expansion stage, and wherein when the data processing apparatus is in the decryption mode the predetermined register is the last register in the set of registers and the set of registers is arranged to shift the values contained the set of registers in the second direction.

Hence the reverse key expansion mode can support a decryption process comprising interleaved reverse key expansion stages and decryption stages, wherein making use of the above mentioned technique for reverse key expansion the reverse evolution of the key schedule can be carried out to provide a respective required reverse key value for the respective reverse key expansion stage. Moreover, note that it is the same data processing circuitry which carries out both the reverse key expansion and the decryption process, thus only a data processing apparatus of limited size and storage capability is required.

The decryption process may comprise an initial decryption stage for which the intermediate data item is not based on the result of a preceding reverse key expansion stage. Depending on the decryption algorithm being implemented it may be useful for the data processing apparatus to support an initial decryption stage based on the final evolved key value of a previous forward key expansion, i.e. which does not need to be rolled back by a stage before the corresponding decryption stage can be carried out.

The data processing apparatus may further comprise a further set of registers each arranged to initially receive a further respective input data item, wherein in the forwards key expansion mode the control circuitry controls the data processing circuitry such that the respective input data items initially received by each register of the further set of registers is a portion of the plaintext data item.

Accordingly the data processing apparatus may in total be provided with two sets of registers, wherein a first of these sets is used to hold key values determined as part of the key schedule, whilst the second of these sets is used to hold data values (e.g. plain text being encrypted to cipher-text (in encryption mode) or cipher-text being decrypted to plain text (in decryption mode)). The data processing apparatus can then separately hold both text data items and key value data items that are required on-the-fly to perform either encryption or decryption, without requiring further storage capacity (e.g. memory) accessible in the data processing apparatus. The hardware required to implement the data apparatus is therefore rather limited.

The intermediate data item may comprise two or more segments and the data processing circuitry comprises translation circuitry iteratively to perform a translation process comprising sequentially translating each segment of the two or more segments into a corresponding respective translated value based on a predetermined mapping.

The data processing circuitry may take a variety of forms depending on the relevant encryption algorithm, but may therefore comprise translating segments received into translated segments based on a predetermined mapping. Note in particular however that the translation process comprises sequentially translating the two or more segments. In other words therefore rather than a parallelised arrangement in which the two or more segments might be translated in parallel, the data processing circuitry is thereby arranged to perform these translations sequentially. While this clearly will require a greater number of implementation cycles, only one instance of the translation circuitry need be provided. To take just one example this translation circuitry may for example in some embodiments be referred to as an "S-box" (substitution box), as defined for the relevant encryption algorithm. Again this limits the hardware required to implement the data processing apparatus.

The translation circuitry may comprise a plurality of translation result registers to store translated values, wherein the plurality comprises one fewer translation result register than the intermediate data item comprises segments, wherein the translation process comprises storing each corresponding respective translated value in a translation result register of the plurality of translation result registers up to a penultimate translated value of the two or more translated values, and the translation circuitry is arranged in a final step of the translation process to output a translated data item of translated values comprising content of the plurality of translation result registers and a last non-stored translated value of the two or more translated values.

In such a configuration in which the translation circuitry sequentially translates the segments the provision of a plurality of translation result registers means that the result of each sequential translation can temporarily be buffered in the translation circuitry. However note that there is one fewer translation result register than the number of segments which the translation circuitry translates, in that when the final step of the translation process is carried out to translate the last segment in the sequence this last translated data item can be directly output along with the content of the plurality of translation result registers to thus provide the full translated value of the intermediate data item. Once more this supports a limited hardware configuration for the data processing apparatus.

The data processing circuitry may comprise shift circuitry to perform a circular shift operation on the intermediate data item as part of the data processing operation, wherein the resultant data item is based on a result of the circular shift operation. The shift circuitry may take a variety of forms in dependence on the encryption algorithm to be implemented, but certain encryption algorithms are supported by a circular shift operation. Indeed the shift circuitry itself may operate differently depending on whether a forwards or a reverse key expansion is being implemented and the first and second shift circuitry may be selected between in dependence on which key expansion mode the data processing apparatus is currently operating in.

The shift circuitry may comprise first shift circuitry and second shift circuitry, wherein when the data processing apparatus is in one of the forwards key expansion mode and the reverse key expansion mode, the circular shift operation is performed using the first shift circuitry, and when the data processing apparatus is in one of a decryption mode and an encryption mode, the circular shift operation is performed using the second shift circuitry.

The data processing apparatus may further comprise input selection circuitry at an input of each register of the set of registers to select between a first input and a second input for each register of the set of registers, wherein input selection for each register is dependent on whether the data processing apparatus is in the reverse key expansion mode or the forwards key expansion mode.

It will be recognised from the above discussion that the registers of the set of registers are interconnected differently depending on whether the data processing apparatus is in the reverse key expansion mode or the forward key expansion mode and the provision of input selection circuitry at the input of each register further supports this.

The forwards key expansion mode and the reverse key expansion mode may be defined by a key expansion direction signal and the input selection circuitry may comprise a multiplexer operable to select between the first input and the second input based on the key expansion direction signal. This enables an efficient selection between the first and second input based on the key expansion direction signal to be implemented.

The intermediate data item may be based upon an exclusive OR operation on content of at least two of the set of registers.

The intermediate data item may be variously defined in dependence on the encryption algorithm being implemented, but an exclusive OR operation based on the content of at least two of the set of registers may usefully support at least some encryption algorithms.

Similarly, certain encryption algorithms may also make use of a set of predefined constant parameters as an input to the data processing and on which the intermediate data item may therefore further depend, for example by an additional input to an exclusive OR operation.

The intermediate data item may be further based on a respective constant parameter from among a set of predefined constant parameters.

The key schedule may be suitable for generating a sequence of key values to be used by an SMS4 encryption algorithm.

It will be appreciated from the above discussion that the present techniques may find applicability in supporting a variety of encryption algorithms, but it will also be appreciated from the discussion of some particular embodiments below that the present techniques may find particular applicability when supporting the SMS4 encryption algorithm, i.e. the known Chinese block cipher standard, which may be required for use in protecting wireless networks. In this particular encryption algorithm the input, output and key used are each 128 bits and the algorithm has 32 rounds, each of which modifies one of the four 32-bit words that make up a block by XORing it with a keyed function of three other words. Encryption and decryption have the same structure except that the round key schedule for decryption is the reverse of the round key schedule for encryption.

At least one example described herein provides a method of performing iterative determination of a key schedule in a data processing apparatus, the comprising the steps of: initially receiving respective input data item in a set of registers; performing a data processing operation on an intermediate data item to generate a resultant data item, wherein the intermediate data item is based on content of the set of registers; and updating a value stored in a predetermined register of the set of registers with a current value of the resultant data item at each iterative round of the determination of the key schedule, wherein when the data processing apparatus is in a reverse key expansion mode the predetermined register is a second register in the set of registers updating the value the set of registers comprises shifting values contained in the set of registers in a first direction and feeding back a value in a last register in the set of registers to a first register in the set of registers, and when the data processing apparatus is in a forwards key expansion mode the predetermined register is the last register in the set of registers updating the value comprises shifting the values contained the set of registers in a second direction, and wherein the second direction is an opposite direction to the first direction.

At least one example described herein provides a data processing apparatus for performing iterative determination of a key schedule, the apparatus comprising: means for initially receiving respective input data item in a set of registers; means performing a data processing operation on an intermediate data item to generate a resultant data item, wherein the intermediate data item is based on content of the set of registers; and means for updating a value stored in a predetermined register of the set of registers with a current value of the resultant data item at each iterative round of the determination of the key schedule, wherein when the data processing apparatus is in a reverse key expansion mode the predetermined register is a second register in the set of registers updating the value the set of registers comprises shifting values contained in the set of registers in a first direction and feeding back a value in a last register in the set of registers to a first register in the set of registers, and when the data processing apparatus is in a forwards key expansion mode the predetermined register is the last register in the set of registers updating the value comprises shifting the values contained the set of registers in a second direction, and wherein the second direction is an opposite direction to the first direction.

Some particular embodiments will now be described with reference to the figures.

FIG. 1 schematically illustrates a data processing apparatus 10 in example embodiments. The data processing apparatus 10 comprises a set of registers 12, 14, 16, 18 into which an input data item may be fed before an iterative process of key expansion (forwards or reverse) or of encryption/decryption is carried out. The content of each of the registers 12, 18 is received by the data processing circuitry 20 generating a result data item which update circuitry 22 then causes to update the content of one of the registers of the set of registers. Which register is chosen as the destination depends on the mode in which the data processing apparatus is currently operating and FIG. 1 specifically illustrates the distinction between when the data processing apparatus is operating in a forwards key expansion mode and when it is operating in a reverse key expansion mode. As shown, when operating in the forwards key expansion mode the content of the "last" register 18 receives the output of the update circuitry 22, whilst when the data processing apparatus is in the reverse key expansion mode the "second" register 14 receives the output of the update circuitry 22.

Figure 2B:
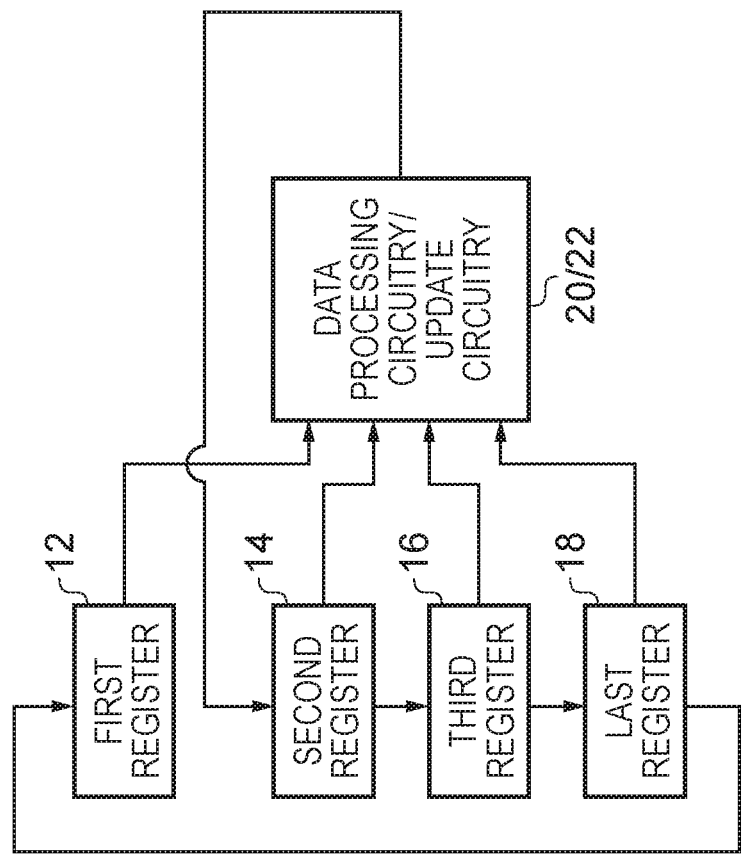
FIG. 2A schematically illustrates a data processing apparatus in a forward key expansion mode in embodiments and FIG. 2B schematically illustrates a data processing apparatus in a reverse key expansion mode in embodiments.
Figure 2A:
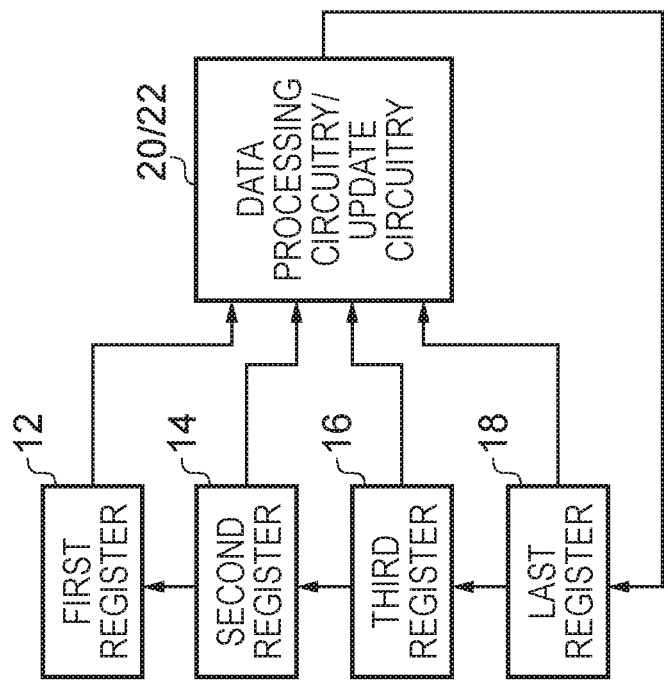

FIGS. 2A and 2B schematically illustrate the same set of registers, data processing circuitry, and update circuitry as shown in FIG. 1 although data processing circuitry 20 and update circuitry 22 have been combined for conciseness of illustration. FIGS. 2A and 2B illustrate respectively the shifting paths used in the forwards key expansion mode and reverse key expansion mode respectively, i.e. in FIG. 2A for the forwards key expansion mode, where the output of the update circuitry 22 is received by the last register 18 the shift path then follows the registers sequentially upwards in the figure. Conversely FIG. 2B illustrates the shift path used in the reverse key expansion mode in which the second register 14 receives the output of the update circuitry 22 and the shift path then follows the registers downwards in the illustration, looping round from the last register 18 into the first register 22.

Figure 3:
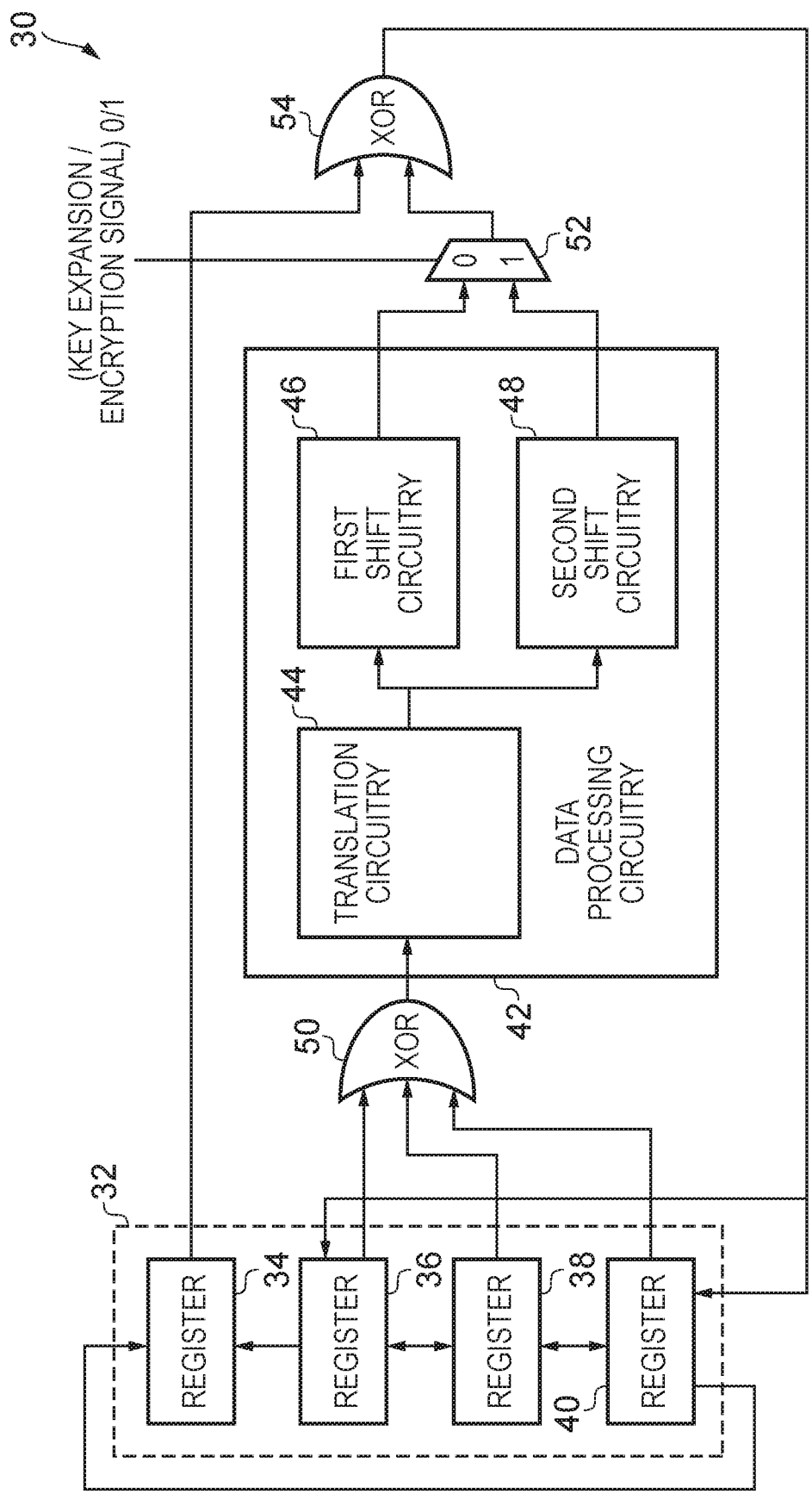
FIG. 3 schematically illustrates a data processing apparatus in embodiments.

FIG. 3 schematically illustrates a data processing apparatus 30 in example embodiments which combines the features of FIGS. 2A and 2B in that the set of registers 32 made up of the individual registers 34, 36, 38, 40 are shown with both possible feedback paths leading into them and showing the two different combined shift paths between them. More detail of the selection between the shift paths is given below with reference to FIG. 4. The data processing circuitry 42 is also shown in more detail in FIG. 3 in that it comprises translation circuitry 44 and two instances of shift circuitry, namely first shift circuitry 46 and second shift circuitry 48. The translation circuitry 44 of the data processing circuitry 42 receives the output of XOR gate 50 the inputs of which are provided by the registers 36, 38, and 40. The translation circuitry 44 performs a substitution on the result generated by XOR 50 as will be described in more detail below. Each of the first and second shift circuitry 46, 48 performs a circular shift operation on the output of the translation circuitry 44, depending on the mode in which the data processing apparatus is currently operating. Specifically, one shift circuitry is provided to support key expansion, whilst the other is provided to support encryption/decryption. Whether the data processing apparatus is currently operating in a key expansion mode (either forwards or reverse) or an encryption/decryption mode is defined by a binary input signal received by the multiplex 52 which selects between the outputs of the first shift circuitry 46 and the second shift circuitry 48. This output is XORed with the content of the first register 34 to generate the final result data item which is fed back into the selected register.

Figure 4:
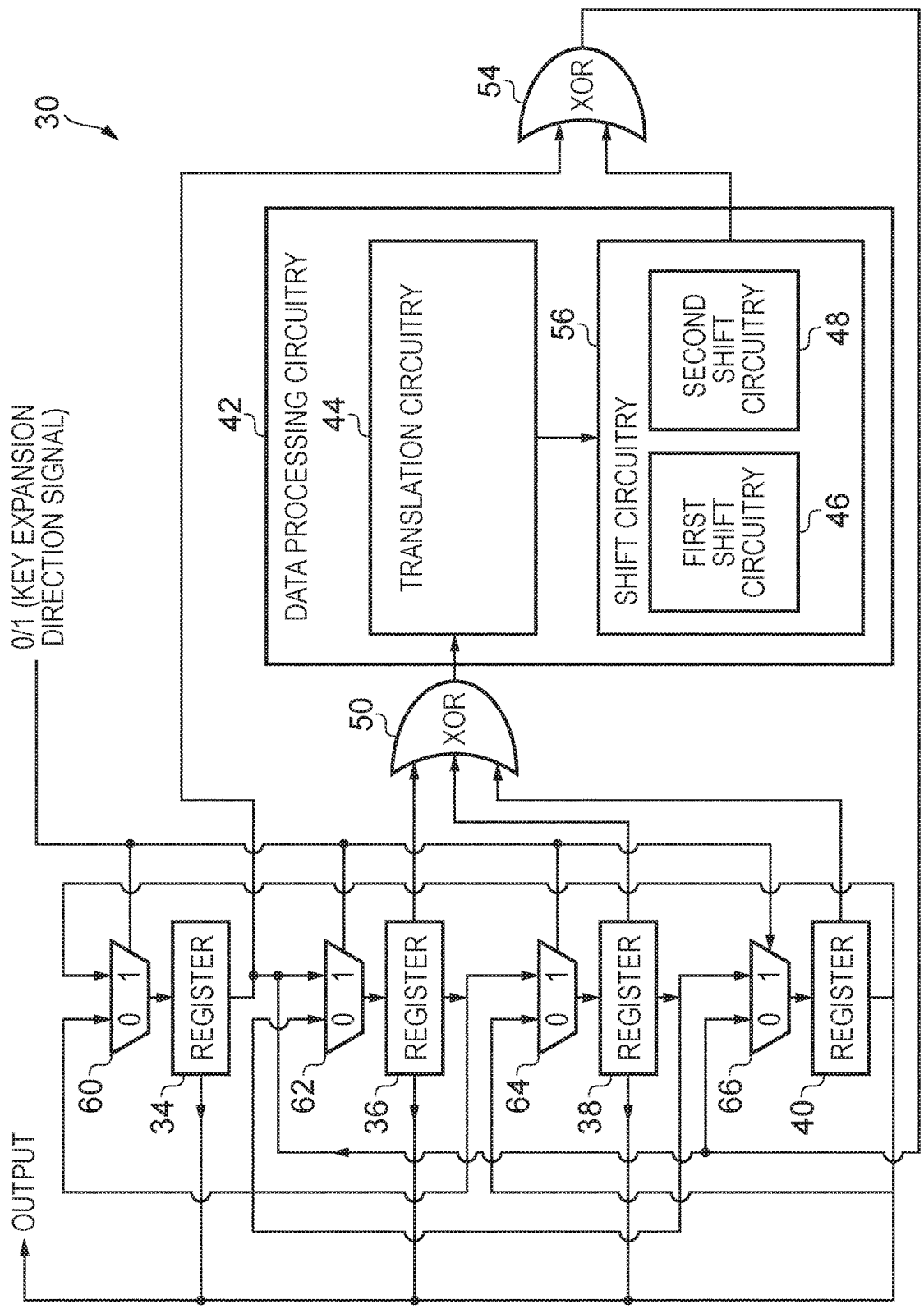
FIG. 4 schematically illustrates a data processing apparatus in embodiments.

FIG. 4 schematically illustrates the data processing apparatus 30 as discussed in FIG. 3 but here focusses on providing more detail of the configuration of the set of registers 32. The data processing circuitry 42, and the XOR gates 50 and 54, are the same as those shown in FIG. 3 other than the first and second shift circuitry 46 and 48 are also generically labelled as shift circuitry 56. The set of registers 32 is shown in FIG. 4 to further comprise an input multiplexer for each register, i.e. input multiplexers 60, 62, 66 respectively. Controlled by the key expansion direction signal (i.e. whether the data processing apparatus is currently in the forwards key expansion mode or the reverse key expansion mode) determines which input each multiplexer passes to its respective register. Accordingly a key expansion direction signal of 0 is used when the data processing apparatus is in the forwards key expansion mode and a key expansion direction signal of 1 is used when the data processing apparatus is in the reverse key expansion mode. It is important to also note that this selection between input and shift direction configurations for the set of registers only applies when the data processing apparatus is in a key expansion mode, since when the data processing apparatus is in an encryption/decryption mode the key expansion direction signal is fixed to be 0 such that the output of the XOR gate 54 always feeds into register 40 and from where content is shifted through the registers in an upwards direction in the figure.

Figure 5:
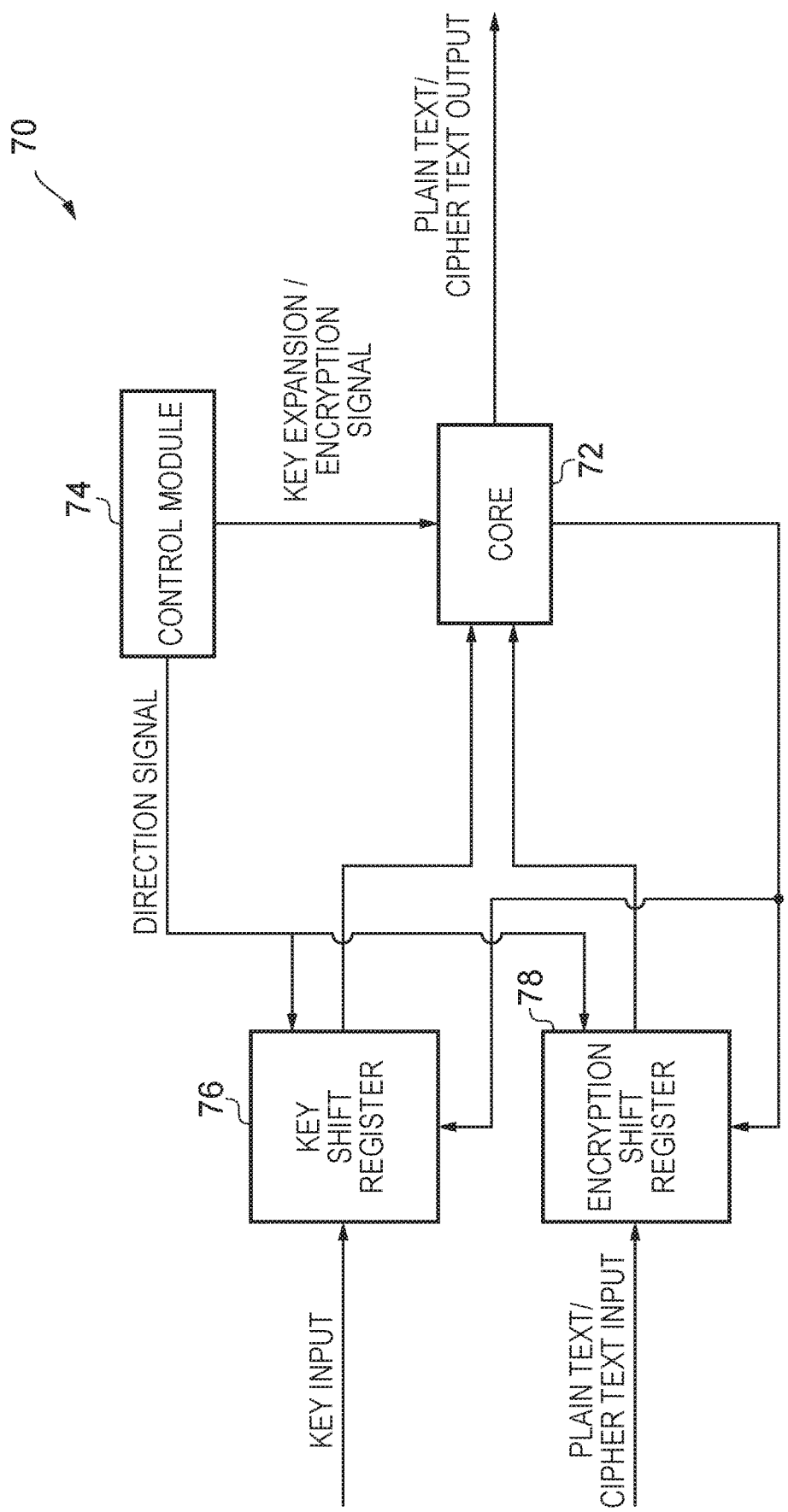
FIG. 5 schematically illustrates a data processing apparatus in embodiments.

FIG. 5 schematically illustrates a data processing apparatus 70 which gives a wider context for the application of the present techniques. The data processing apparatus 70 is shown to comprise a core 72 controlled by a control module 74, and coupled to a key shift register 76 and an encryption shift register 78. Under the control of the control module 74 the core 72 performs key expansion (both forwards and reverse) and encryption/decryption. An input key value is received by the key shift register 76 whilst plain text to be encrypted is received by the encryption shift register 78. Conversely when performing decryption ciphertext is received by the encryption shift register 78. The control module 74 provides a direction signal to both the key shift register 76 and the encryption shift register 78 to indicate the key expansion direction and also provides a selection signal to the core 72 to determine whether it operates in key expansion or encryption/decryption mode. Referring back to FIGS. 1 to 4 it will therefore be appreciated, and taking FIG. 3 as an example thereof, that the core 72 of FIG. 5 may be equated with the data processing circuitry 42 and the associated XOR gates 50, 54 and the multiplexer 52, whilst the set of registers 32 are provided by the key shift register 76 and the encryption shift register 78 in FIG. 5.

Figure 6:
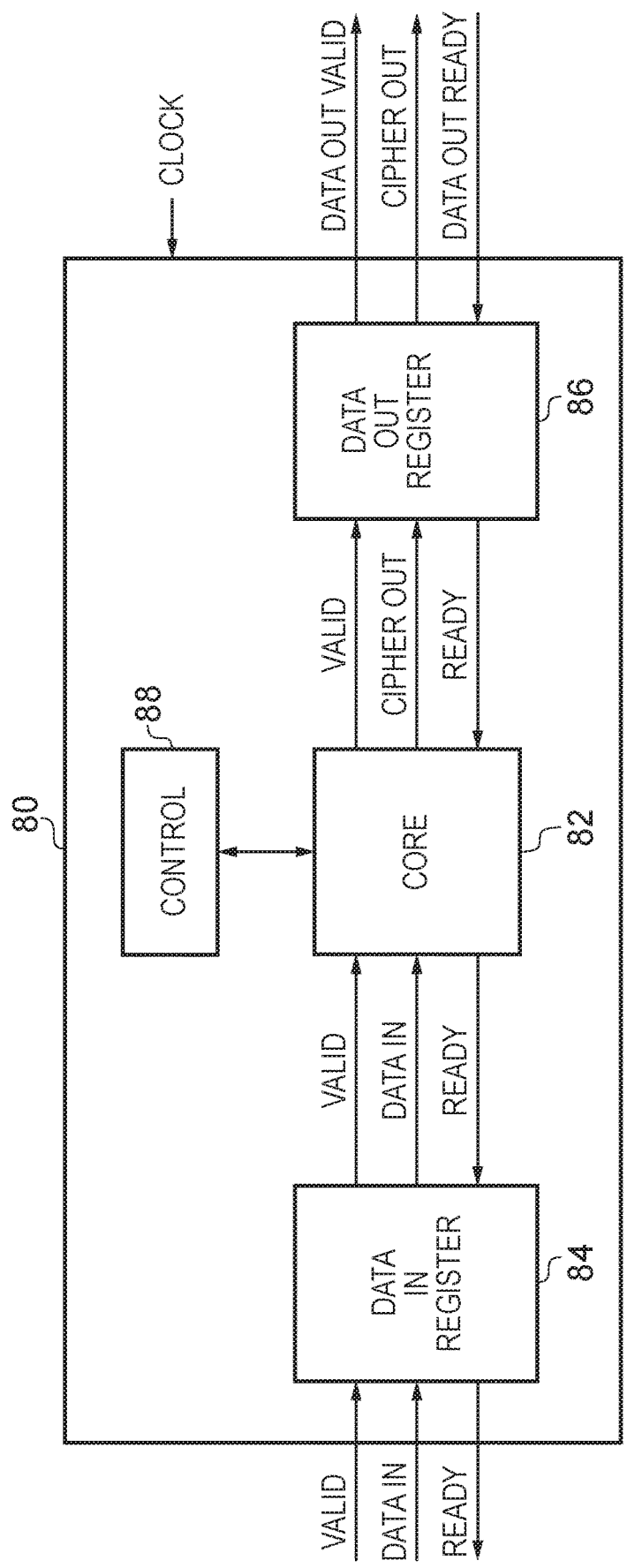
FIG. 6 schematically illustrates a data processing apparatus in embodiments.

FIG. 6 schematically illustrates a data processing apparatus 80 in embodiments, which prevents a yet higher level view of the system presented in FIG. 5. In FIG. 6 the apparatus comprises a central core 82 which may be considered to comprise the core 72 and the shift registers 76, 78 of FIG. 5. This core 82, under control of control unit 88, is sandwiched between data in and data out registers 84, 86, provided to synchronise the apparatus 80 with the wider system in which it is located. Accordingly, data held in the data in register 84 is stalled until the ready signal is received from the core 82 and a set of valid, ready signals enables data to pass through this system, in particular for plain text to be received by the core 82 via the data in register 84 and for the core 82 to generate encrypted data which is output via the data out register 86 in response to a received data out ready signal.

FIGS. 7-12 which follow present a set of example embodiments which are specifically configured to implement the SMS4 algorithm. Within the context of the SMS4 algorithm (and for more detail of this algorithm, reference may be made to "SMS4 Encryption Algorithm for Wireless Networks," Whitfield Diffie and George Ledin, 15 May 2008, Version 1.03" (the entire content of which is incorporated herein by reference), and noting that the mathematical/logical variables discussed below adopt the definitions given in that document), the present techniques have recognised that for the reverse key-expansion operation (that is where i iterates as: i=31, 30, 29, . . . 0) based on $rk_I \in z_2^{32}$, i=0, 1, . . . , 31, the following derivation may be made. Firstly:

$$(K_0, K_1, K_2, K_3) = (MK_0 \oplus FK_0, MK_1 \oplus FK_1, MK_2 \oplus FK_2, MK_3 \oplus FK_3)$$

Then, for i=0, 1, 2, . . . , 31;

$$rk_i = K_{i+4} = K_i \oplus T'(K_{i+1} \oplus K_{i+2} \oplus K_{i+3} \oplus CK_i)$$

$$\rightarrow rk_{i-4} = K_i,$$

Then, if we XOR both sides of the equation with the function $T''(K_{i+1} \oplus K_{i+2} \oplus K_{i+3} \oplus CK_i)$, and nothing in particular the following observations:

the XOR operation is associative:

$$T'(x) \oplus T'(x) = 0; \text{ and}$$

$$K_i \oplus 0 = K_i.$$

We obtain:

$$K_{i+4} = K_i \oplus T'(K_{i+1} \oplus K_{i+2} \oplus K_{i+3} \oplus CK_i) / \oplus T'(K_{i+1} \oplus K_{i+2} \oplus K_{i+3} \oplus CK_i)$$

Hence the result will be:

$$rk_{i-4} = K_i = K_{i+4} \oplus T'(K_{i+1} \oplus K_{i+2} \oplus K_{i+3} \oplus CK_i)$$

Taking the first three iterations of the reverse expansion, this means that those values of $rk_i/K_i$ may be obtained as:
For i=31

$$rk_{27} = K_{31} = K_{35} \oplus T'(K_{32} \oplus K_{33} \oplus K_{34} \oplus CK_{31})$$

For i=30

$$rk_{26} = K_{30} = K_{34} \oplus T'(K_{31} \oplus K_{32} \oplus K_{33} \oplus CK_{30})$$

For i=29

$$rk_{25} = K_{29} = K_{33} \oplus T'(K_{30} \oplus K_{31} \oplus K_{32} \oplus CK_{29})$$

In other words, for the reverse key expansion, the above three expressions demonstrate that for a consecutive set of K values at any given iteration, they are ordered such that the lowest indexed K value forms the second value in each expression, with the next highest K values forming the third and fourth values in each expression, whilst the highest valued K value forms the first K value in each expression. This corresponds to the above described configuration of a set of four registers in a shift register, when the reverse key expansion is being carried out, arranged such that the output of the data processing on the content in a round function provides the input to the "second" register, wherein the shifting between the registers moves values from the second to the third register, from the third register to the fourth register, and feeds back the value from the fourth register into the first register.

Figure 7:
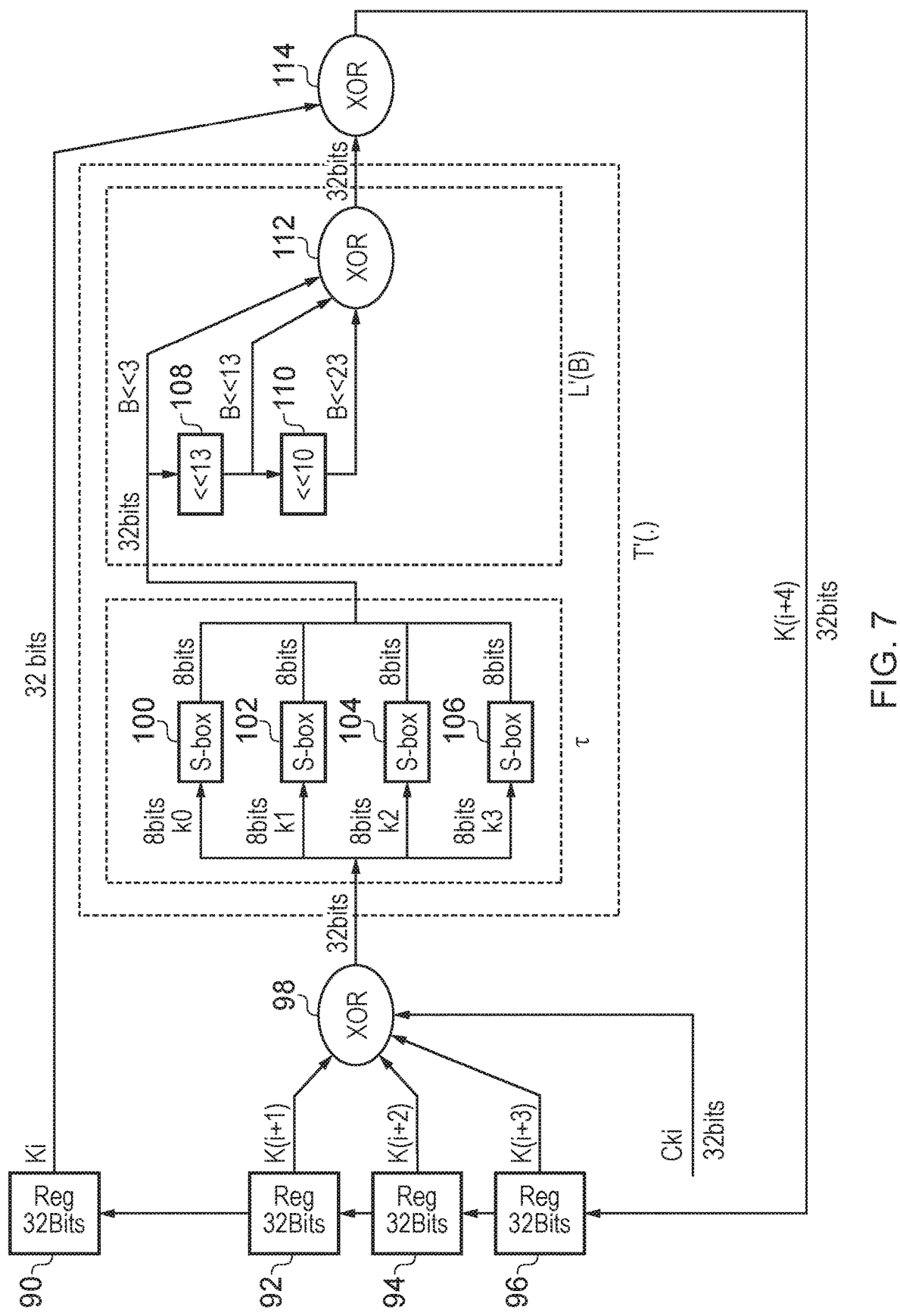
FIG. 7 schematically illustrates a data processing apparatus in a forward key expansion mode in embodiments.

A first configuration for performing forwards key expansion is shown in FIG. 7. From the set of four 32-bit registers 90, 92, 94, 96, the second, third and fourth registers 92, 94, 96 provide inputs to the XOR 98, with a further input being provided by a the constant parameter $Ck_i$, which are locally stored. The XOR 98 generates a 32-bit input to the non linear transformation τ which in the illustrated configuration is provided by four S-boxes 100, 102, 104, 106 in parallel. Each S-box transforms 8 bits together to provide the 32-bit input into the linear transformation L', which for this forwards key expansion is provided as the (circular) 13-bit left shift 108, the (circular) 10-bit left shift 110, and the XOR 112. The content of the first register 90 together with the output of XOR 112 form the input to XOR 114, generating the result value K(i+4) which is fed back to form the new value to be stored in the fourth register 96. As illustrated the set of registers is configured, in this mode, to shift content upwards in the figure.

Figure 8:
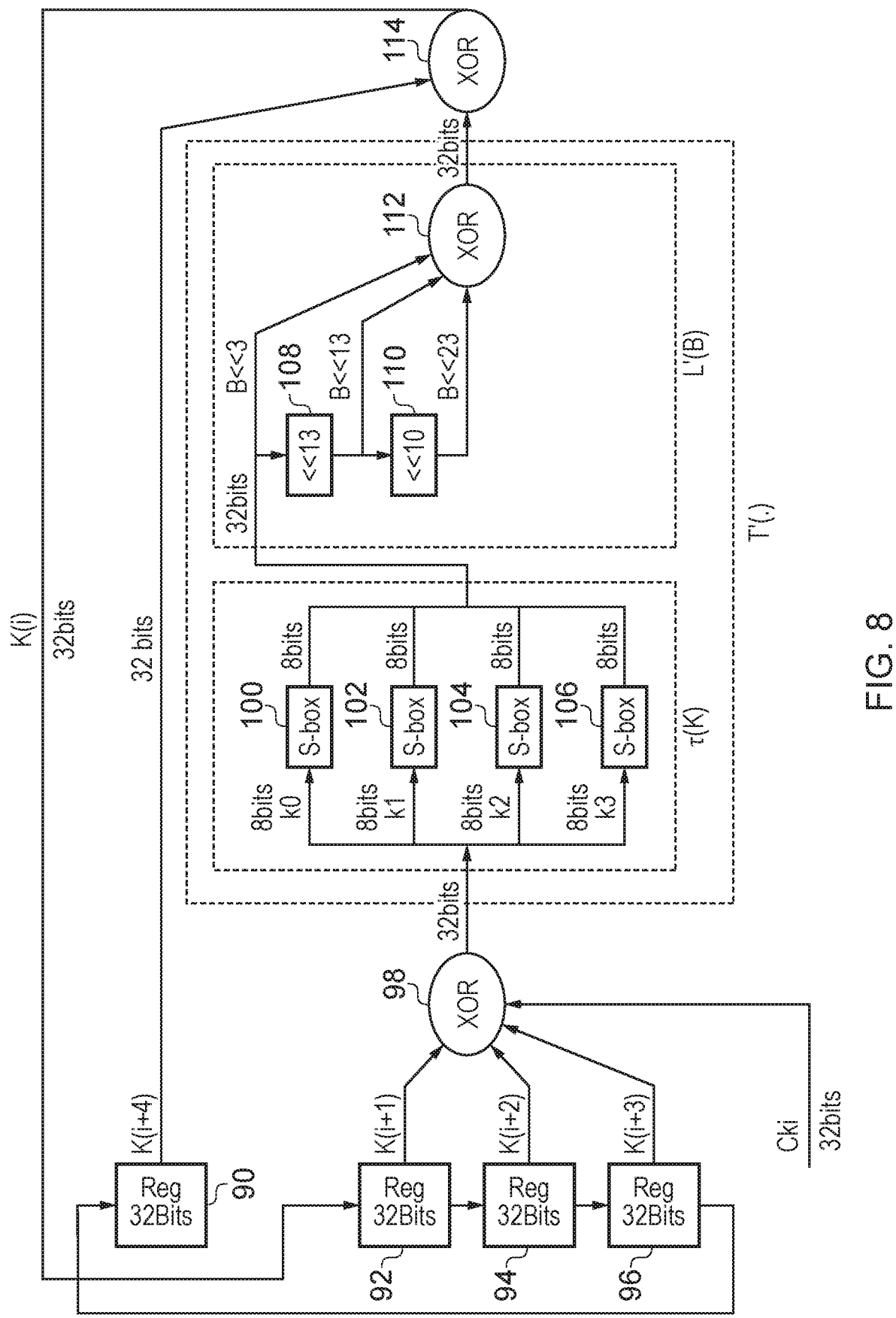
FIG. 8 schematically illustrates a data processing apparatus in a reverse key expansion mode in embodiments.

Conversely FIG. 8 schematically illustrates the data flow when the same apparatus is configured for reverse key expansion. The same set of components is represented being at FIG. 8 as was described above with reference to FIG. 7. The differences are that a) the output of the XOR 114 provides K(i), which is fed back to provide the input to the second 32-bit register 92, and b) the shifting proceeds generally downwards in the figure, with output of the fourth 32-bit register 96 looping round to provide the input to the first 32 bit register 90.

Figure 9:
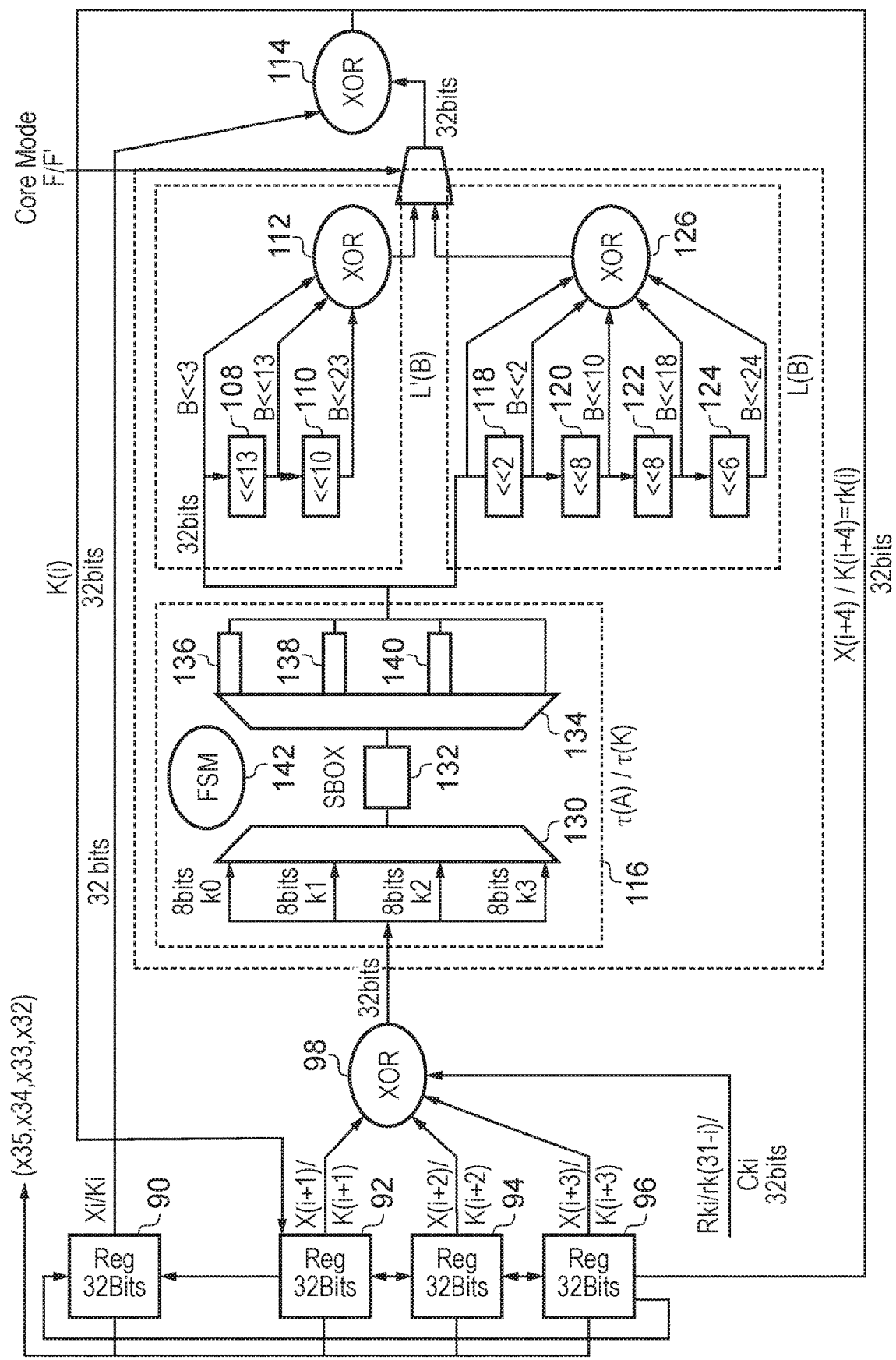
FIG. 9 schematically illustrates a data processing apparatus showing its dual mode functionality of supporting an encryption/decryption round function and a forward/reverse key expansion round function in embodiments.

Accordingly, with reference to FIG. 7 and FIG. 8 will be understood that the same set of components can provide both the forwards and the reverse key expansion functionality. Turning now to FIG. 9 it is shown how the same set of components, with the addition of an alternative set of shifting circuitry to provide the linear substitution L, enables the same set of components also to provide encryption/decryption functionality, as well as the above described forwards/reverse key expansion functionality. Hence the same set of components as were described above with reference to FIGS. 7 and 8 are shown again in FIG. 9, with the addition of the alternative set of shifting circuitry represented by the bit shifters 118, 120, 122 and 124, which provide the (circular) 2-, 8-, 8-, and 6-bit left shifts forming part of the linear substitution L required when encryption or decryption is performed. Accordingly, a multiplexer 128 is also provided to select between the output of the two sets of shift circuitry, this providing the input into the XOR 114. Note also that the input into XOR 98 can instead provide Rki/rki(31−i) when the apparatus is in encryption/decryption round function mode.

There is a further difference between the components illustrated in FIGS. 7&8 and that is shown in FIG. 9, namely the manner in which the non-linear substitution τ is performed. Whereas in FIGS. 7 and 8 four S-boxes are provided in parallel, in the embodiments shown in FIG. 9 a single S-box is provided. Accordingly, as shown in FIG. 9, the non-linear substitution functionality 116 is provided by a multiplexer 130, a single S-box 132, a selection multiplexer 134, three 8-bit registers 136, 138, 140, and a finite state machine 142. The finite state machine 142 controls the operation of the other components providing the non linear substitution functionality 116. In operation the multiplexer 130 selects between the four 8-bit parts of the 32-bit input received from XOR 98 and passes this to the S-box 132 which performs its substitution. In turn this substituted output is directed by means of the multiplexer 134 to one of the 8-bit registers 136, 138, 140 if it is one of the first three 8-bit parts of the 32-bit value received. Accordingly, the first, second and third 8-bit substitutions are made and stored in the respective registers 136, 138, 140. Then, when the final (fourth) 8-bit part is substituted, this output together with the preceding 24 bits output from the registers 136, 138, 140 provide the full substituted 32-bit value. This enables the apparatus to handle a 32-bit substitution with only a single (8-bit) S-box.

Figure 10:
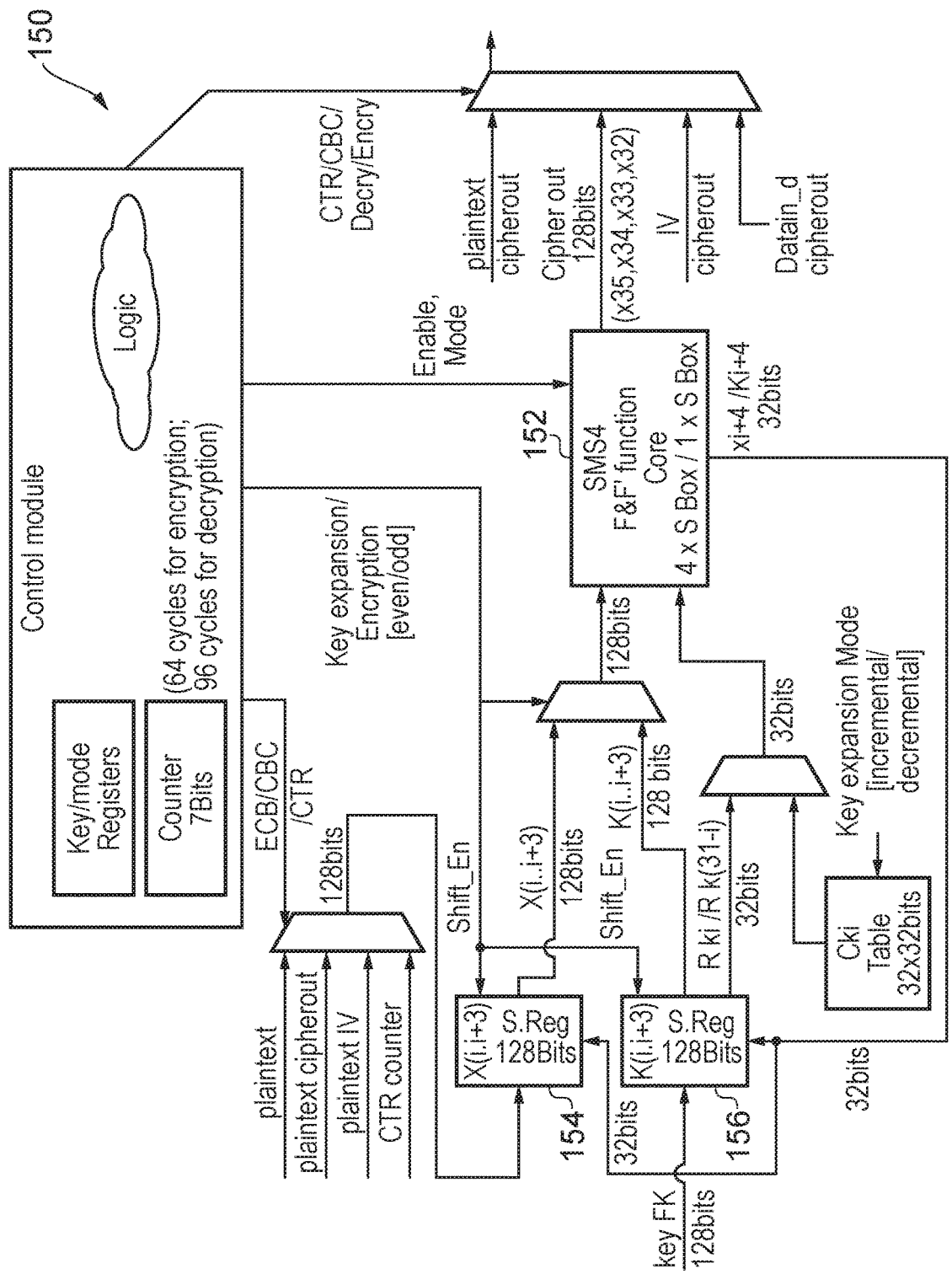
FIG. 10 shows a data processing apparatus in embodiments.

FIG. 10 schematically illustrates further example embodiments, noting that in particular within the data processing apparatus 150, the SMS4 F&F' function core 152 is labelled in FIG. 10 as comprising either four (parallel) S-boxes or just one S-box. This refers to the two possible implementations for the non-linear substitution functionality shown in FIG. 7/8 on the one hand and in FIG. 9 on the other hand, namely whether four S-boxes are used in parallel or one S-box is used in four sequential steps. FIG. 10 could be implemented in either manner. It will be appreciated that the set of four 32-bit shift registers 90, 92, 94, 96 of FIGS. 7, 8 and 9 are represented by the shift registers 154 and 156 in FIG. 10.

The stages of operation of the SMS4 architecture shown in FIG. 10 are set out in FIGS. 11A-C for the four S-box implementation and in FIGS. 12A-C for the one S-box implementation. As can be seen in the representation of FIG. 10 the apparatus is configured to handle 128-bit sections of data (i.e. 16 bytes). Hence, for the four S-box implementation, after updating the key and receiving 16 new bytes of data, for encryption the apparatus runs in forwards key expansion mode for every even cycle and encryption mode for every odd cycle, leading to a total of 64 cycles for every 16 bytes of plain text. Conversely (but still for the four S-box implementation) for decryption the apparatus first runs the forwards key expansion mode for 32 cycles (FIG. 11B) (in order to create the fully evolved key schedule value as the starting point) and then runs the reverse key expansion mode for every odd cycle (28 times) and the decryption operation every even cycle (32 times) leading to a total of 92 cycles for every 16 bytes of plain text.

This is to be contrasted with the single S-box implementation according to which, after updating the key and receiving 16 new bytes of data, for encryption (see FIG. 12A) the module runs the forwards key expansion operation every [counter/four is even] cycle and the encryption operation for every [counter/four is odd] cycle, leading to a total of 4×64=256 cycles for every 16 bytes of plain text. Conversely (still referring to the single S-box implementation) for decryption the apparatus runs first in the forwards key expansion mode for 4×32=128 cycles (again, to create the fully evolved key schedule value as the starting point) and then in the reverse key expansion mode every [counter/four is odd] cycle (28 times) and in decryption mode every [counter/four is even] cycle (32 times), leading to a total of 4×92=368 cycles for every 16 bytes of plain text. In summary, it can be seen that an implementation trade off choice is therefore made in selecting between the four S-box or single S-box implementations, wherein the four S-box implementation requires a larger SMS4 function core to be provided, whilst the single S-box implementation takes longer to perform the encryption or decryption.

The operation of two further configurational variants is shown in FIGS. 11D, 11E and 11F and in 12D, 12E and 12F respectively, which show that these configurations additionally roll back the key to its initial value at the conclusion of each encryption/decryption operation. This in particular means that storage for the key value is not required, and a load key operation is not needed, since it is returned to its initial value (i.e to the 128-bit set of values [K0,K1,K2,K3]) after every encryption/decryption operation.

Figure 13:
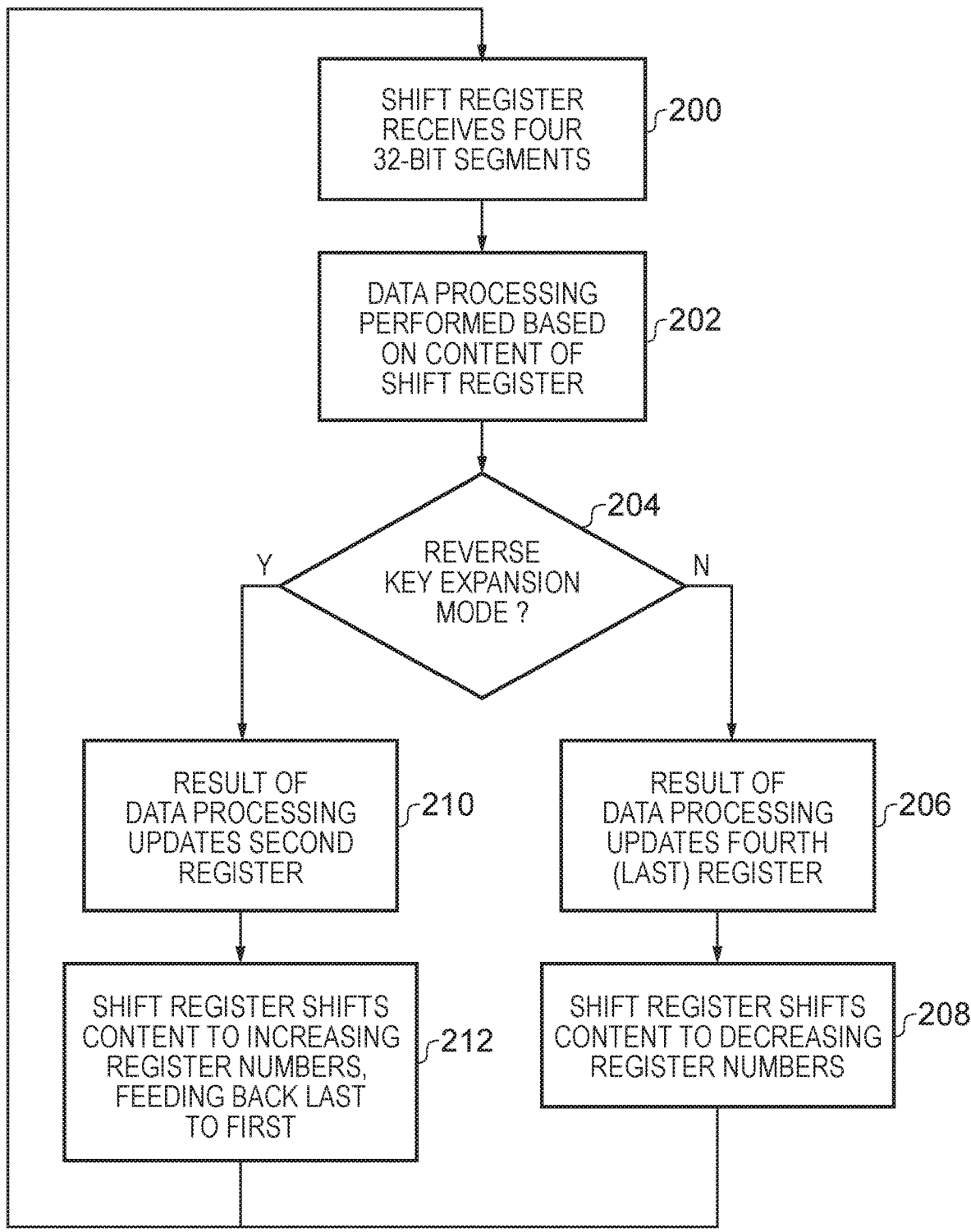
FIG. 13 shows a sequence of steps which are taken by embodiment methods.

FIG. 13 is a flow diagram illustrating a sequence of steps which are taken by embodiments of the present techniques. In particular, this sequence of steps illustrates the use of an exemplary set of four 32-bit registers coupled together to form a shift register, wherein the shifting of content between the four registers is different depending on whether the apparatus is in a reverse key expansion mode or not. The flow can be considered to begin at step 200, where the shift register receives four 32-bit segments (i.e. 16 new bytes). Then at step 202 data processing is performed based on the content of the four registers of the shift register and at step 204 it is determined if the apparatus is currently in reverse key expansion mode. If it is not then the flow proceeds to step 206, where the result of the data processing updates the fourth (last) register of the set of four 32-bit registers making up this shift register. Then at step 208 the step register shifts the content to decreasing register numbers, i.e. the newly received content in the fourth register displaces the content in the third register, the content of which is displaced to the second register, the content of which is displaced to the first register (compare to FIG. 2A). Alternatively if at step 204 it is determined that the apparatus is currently in reverse key expansion mode, then the flow proceeds to step 210, where the result of the data processing updates the second register in the set of four. Then at step 212 the content is shifted between the registers to increasing register numbers, feeding back content of the last (fourth) register to the first register (compare to FIG. 2B). From either step 212 or step 208 the flow returns to step 200.

In brief overall summary, data processing apparatuses and methods for performing an iterative determination of a key schedule are provided. A set of registers initially receives an input data item and data processing is then performed using the content of the set of registers as an input. The result of this data processing is then used to update a value stored in a predetermined register of the set of registers at each iterative round of the determination of the key schedule. Dependent on whether the data processing apparatus is in a reverse key expansion mode or a forwards key expansion mode determines which register in the set of registers is that predetermined register. Further, the set of registers is arranged to shift values contained in the set of registers in a direction which depends on whether the data processing apparatus is in a reverse key expansion mode or a forwards key expansion mode. The directions for the two modes are opposite to one another.

In the present application, the words "configured to . . ." or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A data processing apparatus for performing an iterative determination of a key schedule, the apparatus comprising:
    a set of registers each arranged to initially receive a respective input data item;
    data processing circuitry to perform a data processing operation on an intermediate data item and to generate a resultant data item, wherein the intermediate data item is based on content of the set of registers; and
    register update circuitry to update a value stored in a predetermined register of the set of registers with a current value of the resultant data item at each iterative round of the determination of a key schedule,
    wherein when the data processing apparatus is in a reverse key expansion mode the predetermined register is a second register in the set of registers and the set of registers is arranged to shift values contained in the set of registers in a first direction and to feedback a value in a last register in the set of registers to a first register in the set of registers,
    wherein when the data processing apparatus is in a forwards key expansion mode the predetermined register is the last register in the set of registers and the set of registers is arranged to shift the values contained the set of registers in a second direction, and wherein the second direction is an opposite direction to the first direction; and
    control circuitry to control the data processing apparatus to perform an encryption process in which the data processing apparatus alternately performs a forwards key expansion stage in the forwards key expansion mode and performs an encryption stage in an encryption mode,
    wherein in the forwards key expansion mode, the control circuitry is arranged to control the data processing circuitry such that the respective input data items initially received by each register of the set of registers is a portion of an encryption key,
    wherein in the encryption mode, the control circuitry is arranged to control the data processing circuitry such that the respective input data items initially received by each register of the set of registers is a portion of a plaintext data item and such that the intermediate data item is further based on the result of a preceding forwards key expansion stage, and
    wherein when the data processing apparatus is in the encryption mode, the predetermined register is the last register in the set of registers and the set of registers is arranged to shift the values contained the set of registers in the second direction.

2. The data processing apparatus according to claim 1, wherein the control circuitry is arranged to control the data processing circuitry to perform a reverse key expansion sequence in the reverse key expansion mode comprising performing a plurality of reverse key expansion stages,
    wherein the reverse key expansion sequence is arranged to reverse the data processing operations performed by the data processing circuitry in the forwards key expansion stages of the encryption process.

3. The data processing apparatus according to claim 2, wherein the reverse key expansion sequence comprises performing the plurality of reverse key expansion stages sequentially.

4. The data processing apparatus according to claim 2, wherein the control circuitry is further arranged to control the data processing apparatus to perform a decryption process in which the data processing apparatus alternately performs a reverse key expansion stage of the plurality of reverse key expansion stages in the reverse key expansion mode and performs a decryption stage in a decryption mode,
    wherein in the reverse key expansion mode the control circuitry controls the data processing circuitry such that the respective input data items initially received by each register of the set of registers is a portion of a decryption key,
    wherein in the decryption mode the control circuitry controls the data processing circuitry such that the respective input data items initially received by each register of the set of registers is a portion of a ciphertext data item and such that the intermediate data item is further based on the result of a preceding reverse key expansion stage,
    and wherein when the data processing apparatus is in the decryption mode the predetermined register is the last register in the set of registers and the set of registers is arranged to shift the values contained the set of registers in the second direction.

5. The data processing apparatus according to claim 4, wherein the decryption process comprises an initial decryption stage for which the intermediate data item is not based on the result of a preceding reverse key expansion stage.

6. The data processing apparatus according to claim 1, further comprising a further set of registers each arranged to initially receive a further respective input data item,
    wherein in the forwards key expansion mode the control circuitry controls the data processing circuitry such that the respective input data items initially received by each register of the further set of registers is a portion of the plaintext data item.

7. The data processing apparatus according to claim 1, wherein the intermediate data item comprises two or more segments and the data processing circuitry comprises translation circuitry iteratively to perform a translation process comprising sequentially translating each segment of the two or more segments into a corresponding respective translated value based on a predetermined mapping.

8. The data processing apparatus according to claim 7, wherein the translation circuitry comprises a plurality of translation result registers to store translated values, wherein the plurality comprises one fewer translation result register than the intermediate data item comprises segments, wherein the translation process comprises storing each corresponding respective translated value in a translation result register of the plurality of translation result registers up to a penultimate translated value of the two or more translated values, and the translation circuitry is arranged in a final step of the translation process to output a translated data item of translated values comprising content of the plurality of translation result registers and a last non-stored translated value of the two or more translated values.

9. The data processing apparatus according to claim 1, wherein the data processing circuitry comprises shift circuitry to perform a circular shift operation on the intermediate data item as part of the data processing operation, wherein the resultant data item is based on a result of the circular shift operation.

10. The data processing apparatus according to claim 9, wherein the shift circuitry comprises first shift circuitry and second shift circuitry, wherein when the data processing apparatus is in one of the forwards key expansion mode and the reverse key expansion mode, the circular shift operation is performed using the first shift circuitry, and when the data processing apparatus is in one of a decryption mode and an encryption mode, the circular shift operation is performed using the second shift circuitry.

11. The data processing apparatus according to claim 1, further comprising input selection circuitry at an input of each register of the set of registers to select between a first input and a second input for each register of the set of registers, wherein input selection for each register is dependent on whether the data processing apparatus is in the reverse key expansion mode or the forwards key expansion mode.

12. The data processing apparatus according to claim 11, wherein the forwards key expansion mode and the reverse key expansion mode are defined by a key expansion direction signal and the input selection circuitry comprises a multiplexer operable to select between the first input and the second input based on the key expansion direction signal.

13. The data processing apparatus according to claim 1, wherein the intermediate data item is based upon an exclusive OR operation on content of at least two of the set of registers.

14. The data processing apparatus according to claim 13, wherein the intermediate data item is further based on a respective constant parameter from among a set of predefined constant parameters.

15. The data processing apparatus according to claim 1, wherein the key schedule is suitable for generating a set of key values to be used by an SMS4 encryption algorithm.

16. A method of performing iterative determination of a key schedule in a data processing apparatus, the comprising the steps of:

initially receiving respective input data item in a set of registers;

performing a data processing operation on an intermediate data item to generate a resultant data item, wherein the intermediate data item is based on content of the set of registers;

updating a value stored in a predetermined register of the set of registers with a current value of the resultant data item at each iterative round of the determination of the key schedule, wherein when the data processing apparatus is in a reverse key expansion mode the predetermined register is a second register in the set of registers updating the value the set of registers comprises shifting values contained in the set of registers in a first direction and feeding back a value in a last register in the set of registers to a first register in the set of registers, and when the data processing apparatus is in a forwards key expansion mode the predetermined register is the last register in the set of registers updating the value comprises shifting the values contained the set of registers in a second direction, and wherein the second direction is an opposite direction to the first direction; and controlling the data processing apparatus to perform an encryption process in which the data processing apparatus alternately performs a forwards key expansion stage in the forwards key expansion mode and performs an encryption stage in an encryption mode, wherein in the forwards key expansion mode, the controlling controls the data processing circuitry such that the respective input data items initially received by each register of the set of registers is a portion of an encryption key, wherein in the encryption mode, the controlling controls the data processing circuitry such that the respective input data items initially received by each register of the set of registers is a portion of a plaintext data item and such that the intermediate data item is further based on the result of a preceding forwards key expansion stage, and wherein when the data processing apparatus is in the encryption mode, the predetermined register is the last register in the set of registers and the set of registers is arranged to shift the values contained the set of registers in the second direction.

17. A data processing apparatus for performing iterative determination of a key schedule, the apparatus comprising:

means for initially receiving respective input data item in a set of registers;

means performing a data processing operation on an intermediate data item to generate a resultant data item, wherein the intermediate data item is based on content of the set of registers;

means for updating a value stored in a predetermined register of the set of registers with a current value of the resultant data item at each iterative round of the determination of the key schedule, wherein when the data processing apparatus is in a reverse key expansion mode the predetermined register is a second register in the set of registers updating the value the set of registers comprises shifting values contained in the set of registers in a first direction and feeding back a value in a last register in the set of registers to a first register in the set of registers, and when the data processing apparatus is in a forwards key expansion mode the predetermined register is the last register in the set of registers updating the value comprises shifting the values contained the set of registers in a second direction, and wherein the second direction is an opposite direction to the first direction; and means for controlling the data processing apparatus to perform an encryption process in which the data processing apparatus alternately performs a forwards key expansion stage in the forwards key expansion mode and performs an encryption stage in an encryption mode, wherein in the forwards key expansion mode, the means for controlling is arranged to control the data processing circuitry such that the respective input data items initially received by each register of the set of registers is a portion of an encryption key, wherein in the encryption mode, the means for controlling is arranged to control the data processing circuitry such that the respective input data items initially received by each register of the set of registers is a portion of a plaintext data item and such that the intermediate data item is further based on the result of a preceding forwards key expansion stage, and wherein when the data processing apparatus is in the encryption mode, the predetermined register is the last register in the set of registers and the set of registers is arranged to shift the values contained the set of registers in the second direction.

\* \* \* \* \*